Figure 1:
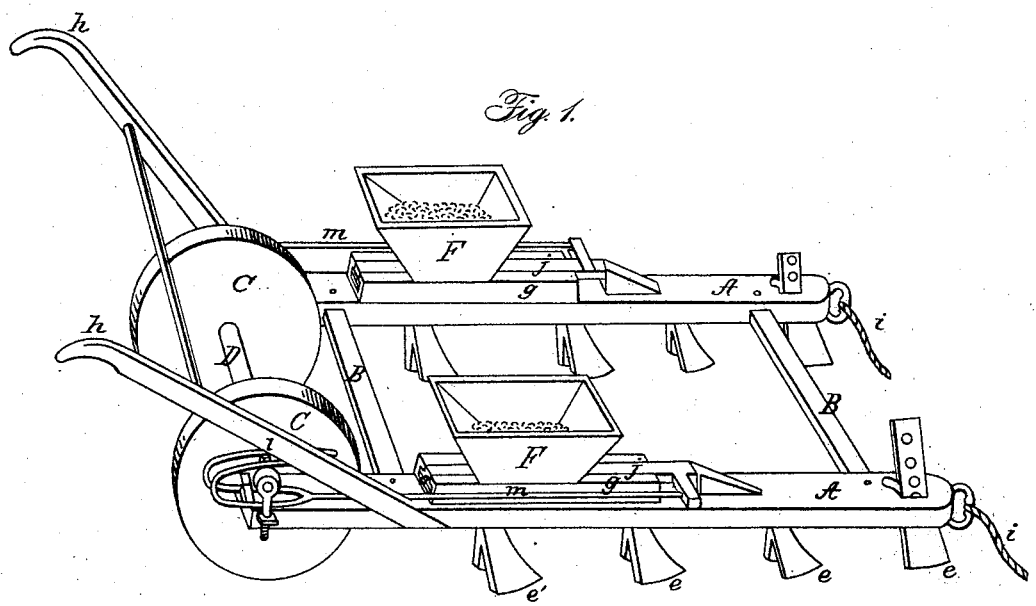
Figure 2:
Figure 2:
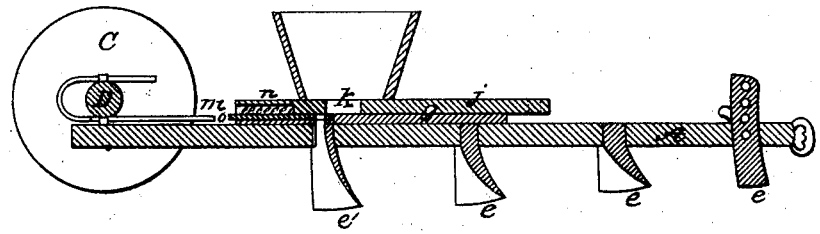

W. BUCKMINSTER.
Seed-Planter.

No 969. Patented Oct. 8, 1838.

UNITED STATES PATENT OFFICE.

WM. BUCKMINSTER, OF FRAMINGHAM, MASSACHUSETTS.

IMPROVEMENT IN THE MACHINE FOR PLANTING ALL KINDS OF SEEDS.

Specification forming part of Letters Patent No. 969, dated October 8, 1838.

*To all whom it may concern:*

Be it known that I, WILLIAM BUCKMINSTER, of Framingham, in the county of Middlesex and Commonwealth of Massachusetts, have invented and constructed a new and useful machine for planting seeds of all descriptions called the "Planting Harrow," which is described as follows, reference being had to the annexed drawings.

My planting-harrow consists of two sills, A A, four feet long, or more, four inches wide, and two inches thick. They are placed parallel to each other at such distance as the rows are to be planted, and are connected together by the slats B B, which are framed in transversely to the sills, and so loose or open jointed as to allow the harrow to rock and conform to uneven ground. Into each sill four or five teeth are inserted in a direct row, so as to follow each other, c c c. These teeth, especially the last one, are of cast iron and are hollow. Their shape is like a small plowshare that turns the furrow both ways, or, rather, broad at bottom like the foot of a colt a year old. The teeth are six or seven inches long and made sharp at the bottom. The hole through them is longitudinal and extends down two-thirds the length of the tooth.

A wheel fifteen inches or more in diameter, l l, and four inches thick is attached to the hind end of each sill. The gudgeons of the wheels turn in the eye of a bolt that has a nut and screw on it, by which the harrow is raised or lowered on the wheel at pleasure, and in this manner the hind tooth is sunk more or less deep into the earth. Nearly over each hind tooth a stopper, D D, is placed and secured to the sill. The bottom of this stopper is a plank twelve or fourteen inches long. It has a longitudinal groove in its upper side, of different width and thickness, according to the size of the seed to be planted. For middle-sized corn or beans this groove should be one-third of an inch deep and one inch and a half wide and filled with a slide, e e, of the same dimensions. This slide has an oblong square hole through that part of it which is covered by the hopper that holds the seed, which hole forms a cup, and is full of seed at the bottom of the hopper when it is in place. To bring the seed out of the hopper and drop it, this slide is moved back toward the wheel an inch or more and far enough to let out a sufficient quantity of seed for a hill.

The hole through the slide, forming a cup for the seed, is made so long that in drawing out the slide back the forward edge of the hole never comes within half an inch of the back side of the hopper, under the edge of which the slide passes, and the seed thus escapes being crushed or wedged in between the slide and the side of the hopper. The surface of the hopper-bottom is nearly three inches square. This slide is drawn out back, so that the manager, who stands behind, may see the seed as it falls into the hind hollow tooth, and through that is buried in the ground.

A cog or cab on the axle of the wheel strikes a rod, f, placed under the axle, and this rod is fastened by nut and screw to the slide, and is shortened or lengthened, as more or less seed is required at a time. For corn or beans two cabs are fixed in the axle, and at every revolution of the wheel the rod is drawn back twice and draws out the seed from underneath the hopper. The gage is a second slide placed directly under the first, having a hole in it one inch square. This gage may be moved forward or back, and regulates the quantity of seed to be dropped at one time.

For small fields only one sill is used and one wheel. A pair of handles, g g, is inserted near the wheels. A harrow with two sills is drawn by means of a common pair of shafts. A harrow with one sill is drawn by a horse, with a common whiffletree and chain fastened to a staple or other iron driven into the top of the fore end of the sill.

When the cab on the axle has operated on the rod and drawn the seed out of the hopper a spiral spring inserted into the fore end of the bottom of the hopper acts on the slide to which it is attached and brings it suddenly back and gives a jar to the hopper, so as to insure the filling of the hole or cup in the slide for a new draft.

I claim as my invention—

1. The general form of this planting-harrow with loose joints.
2. The setting the teeth in a row to follow each other.
3. The form of these teeth with a hole through them.
4. This mode of drawing the seed out of the bottom of the hopper to the back side by means of a square hole through the slide, which forms an oblong cup that never passes wholly under the side of the hopper, one portion of said cup always remaining in the inside of the hopper to save crushing the seeds.

5. The mode of fastening my wheels to the sills so as to raise or sink the hind tooth deeper in the soil to bury the seed deeper.

6. This mode of dropping the seed through a hollow tooth in a harrow dragging on the ground, so that the falling in of the soil behind the tooth covers the seed without any other apparatus, all as described in my foregoing specification, and thus explained in these my claims to originality.

In testimony that the above is a true specification of my said invention, as above described, I have hereto set my hand this 20th day of June, in the year of our Lord 1838.

WM. BUCKMINSTER.

In presence of—
ELOZEN GOODRICH NEOTHEN,
GEO. WOOD.